United States Patent [19]

Tanner

[11] Patent Number: 4,558,605
[45] Date of Patent: Dec. 17, 1985

[54] VALVE ACTUATOR COUPLING

[75] Inventor: Douglas J. Tanner, Rice, Minn.

[73] Assignee: General Signal Corporation, Stamford, Conn.

[21] Appl. No.: 474,490

[22] Filed: Mar. 11, 1983

[51] Int. Cl.[4] .......................... F16H 21/44; B25G 3/00; F16D 1/00
[52] U.S. Cl. ...................................... 74/102; 403/344; 403/375
[58] Field of Search .............. 403/344, 356, 359, 234, 403/237, 253, 254, 256, 257, 373, 375, 383, 385, 400; 464/42; 251/279, 288, 304; 74/99, 102, 104

[56] References Cited

U.S. PATENT DOCUMENTS

| 546,260 | 9/1895 | Timm | 403/256 |
|---|---|---|---|
| 577,701 | 2/1897 | Wilson | 403/256 |
| 825,428 | 7/1906 | Spencer | 403/344 |
| 996,052 | 6/1911 | Bloor | 403/375 |
| 1,011,285 | 12/1911 | Verplast | 403/344 |
| 1,382,829 | 6/1921 | Gibert | 403/344 |
| 1,816,364 | 7/1931 | Deffenbaugh | 403/253 |
| 2,954,754 | 10/1960 | Flick | 121/38 |
| 3,160,077 | 12/1964 | Ribeiro et al. | 92/13 |
| 3,296,877 | 1/1967 | Flick et al. | 74/102 |
| 3,454,305 | 7/1969 | Gilmour | 403/359 |
| 3,457,838 | 7/1969 | Rowe | 74/99 X |
| 3,560,031 | 2/1971 | Gilmour | 403/359 |
| 3,650,506 | 3/1972 | Bruton | 251/26 |
| 3,737,142 | 6/1973 | Boswell et al. | 251/58 |
| 3,814,528 | 6/1974 | Duer | 403/256 |
| 3,867,050 | 2/1975 | Pitner | 403/373 |
| 3,917,424 | 11/1975 | Zugel | 403/344 |
| 3,929,024 | 12/1975 | Sheesley et al. | 74/104 |
| 3,985,151 | 10/1976 | Smith | 137/269 |
| 4,032,245 | 6/1977 | Woodruff | 403/385 |
| 4,217,061 | 8/1980 | Eiland et al. | 403/344 |
| 4,234,161 | 11/1980 | Wilder et al. | 251/279 |
| 4,460,290 | 7/1984 | Mallet | 403/373 |

FOREIGN PATENT DOCUMENTS

| 165372 | 6/1921 | United Kingdom | 403/344 |
|---|---|---|---|
| 375231 | 6/1932 | United Kingdom | 403/359 |
| 650280 | 2/1951 | United Kingdom | 251/279 |

Primary Examiner—Lawrence J. Staab
Attorney, Agent, or Firm—Barnes & Thornburg

[57] ABSTRACT

A valve actuator including a link arm having an adjustable wedge shaped aperture mounted in a circumferial recess of a coupling shaft having a wedge shaped cross-section in the circumferial recess. A coupling clamp is adjustably mounted in a second circumferial recess of the coupling shaft to secure a valve shaft received in an axial recess of the coupling shaft.

9 Claims, 6 Drawing Figures

VALVE ACTUATOR COUPLING

BACKGROUND OF THE INVENTION

The present invention relates generally to valves and more specifically to an improved actuator.

Actuators generally include a force producing section which is transmitted through a coupler to the valve shaft to open and close the valve. The valve actuator is usually mounted on top of the valve housing to which it is to operate upon. The force producing section is usually connected to the coupling shaft by a link arm. In one type of device, the link arm is unitary to the coupling shaft. A typical example are U.S Pat. Nos. 2,954,754, 3,650,506 and 3,929,024. In each of these patents, the valve shaft or an adapter is received in a keyed passage in the coupling shaft.

A second type of coupling shaft and link arm wherein the link arm is mounted to the coupling shaft using a key and a key way are illustrated in U.S. Pat. Nos. 3,160,077; 3,737,142 and 3,985,151. The interior of the link arm and the exterior of the coupling shaft must be precisely machined for their interconnection to prevent any rotational displacement causing hysteresis between the motion of the link arm and the coupling shaft. The importance of the accuracy of the machining increases the cost of the actuator and does not allow for subsequent compensation due to wear.

Where the link arm is unitary to the coupling shaft, a two piece housing must be used. This is substantially more expensive since separate machining steps must be used for each half of the housing. Also more care must be taken to assure alignment of the aperatures in the housing which receive the coupling shaft.

When the link arm is separate from the coupling shaft, the housing can be unitary. This allows a reduction in machining since a single boring will form two aligned aperatures in opposed walls. Some method must be provided to mount the link arm to the coupling shaft after it has been inserted into the housing. The prior art patents use key—key ways or polygram cross-section to interconnect the link arm and coupling shaft. These types of connections produce lost motion with continued uses resulting in undesirable position errors of the valve. A press fit is one solution, but this requires expensive machining and does not allow disassembly for maintenance.

SUMMARY OF THE INVENTION

An object of the present invention is to provide a valve actuator with substantially zero backlash at reduced cost.

Another object of the present invention is to provide a valve actuator having adjustable connections of the link arm and the valve shaft to the coupling shaft.

Still a further object of the present invention is to provide an inexpensive actuator wherein the coupling shaft is essentially a cast element and wherein the connection of a link arm is at cast surfaces and the valve shaft to the coupling shaft is at a cast or a broached surface.

These and other objects of the invention are attained by a valve actuator having a coupling shaft rotatably mounted in a housing. The coupling shaft has a circumferial recess defining a wedged shaped cross-section to which the link arm is adjustably mounted with no lost motion or hysteresis. The link arm includes two pieces which encompass the wedge shaped cross-section in the circumferial recess and is connected to a force producing section at its other end. The valve shaft is also received in an end of the coupling shaft which also includes a circumferial recess and a clamp in the circumferial recess to adjustably enclose and secure the valve shaft to the coupling shaft with no lost motion or hysteresis.

Other objects, advantages and novel features of the present invention will become evident from the following detailed description of the preferred embodiment.

DESCRIPTION OF PREFERRED EMBODIMENTS

Figure 1:
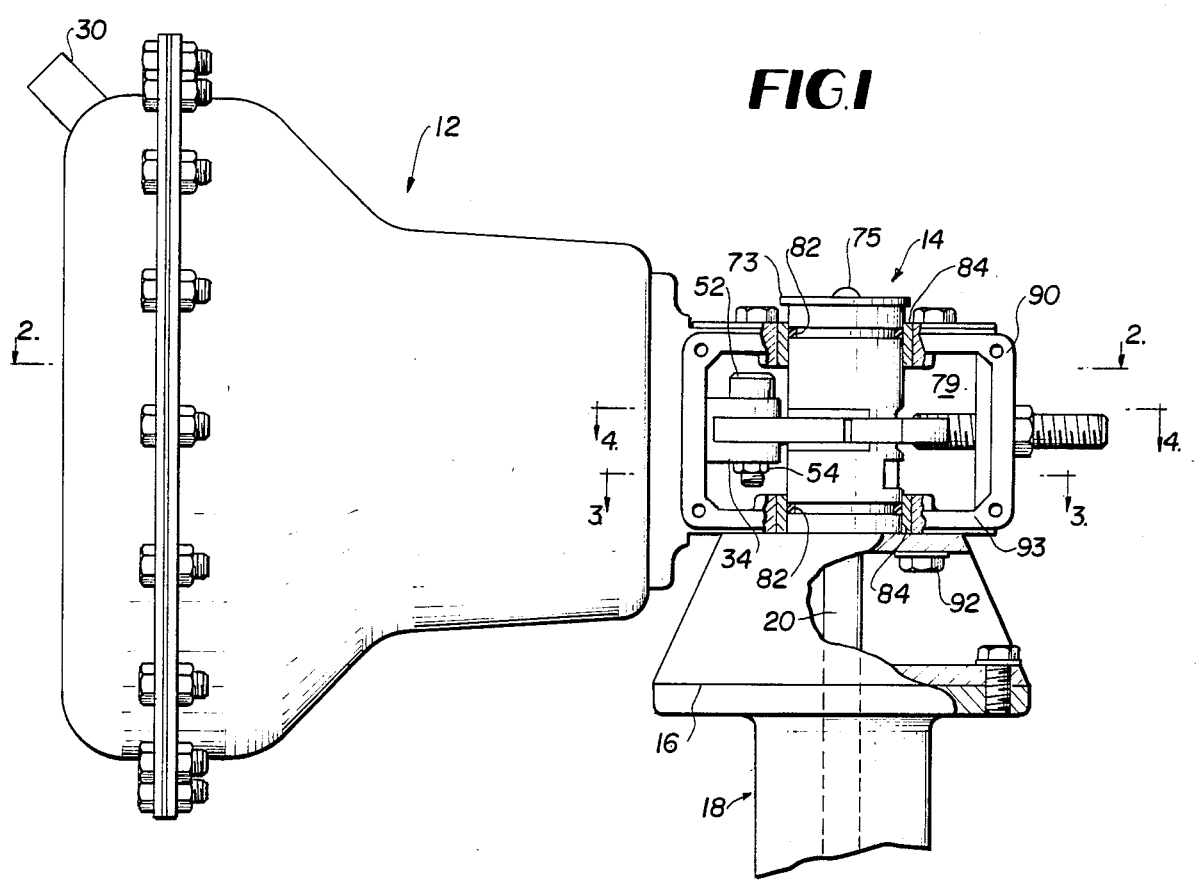
FIG. 1 is a side view of a valve actuator incorporating the principles of the present invention mounted to a valve housing with the face plate removed.

FIG. 1 illustrates a valve actuator 10 including a force producing section section 12 and a coupling section 14. Adapter 16 mounts the valve actuator 10 to the valve housing 18 having a valve shaft 20 extending therefrom. The valve housing 18 may be connected directly to the coupling section 14 without the adaptor 16 for some valves.

Figure 2:
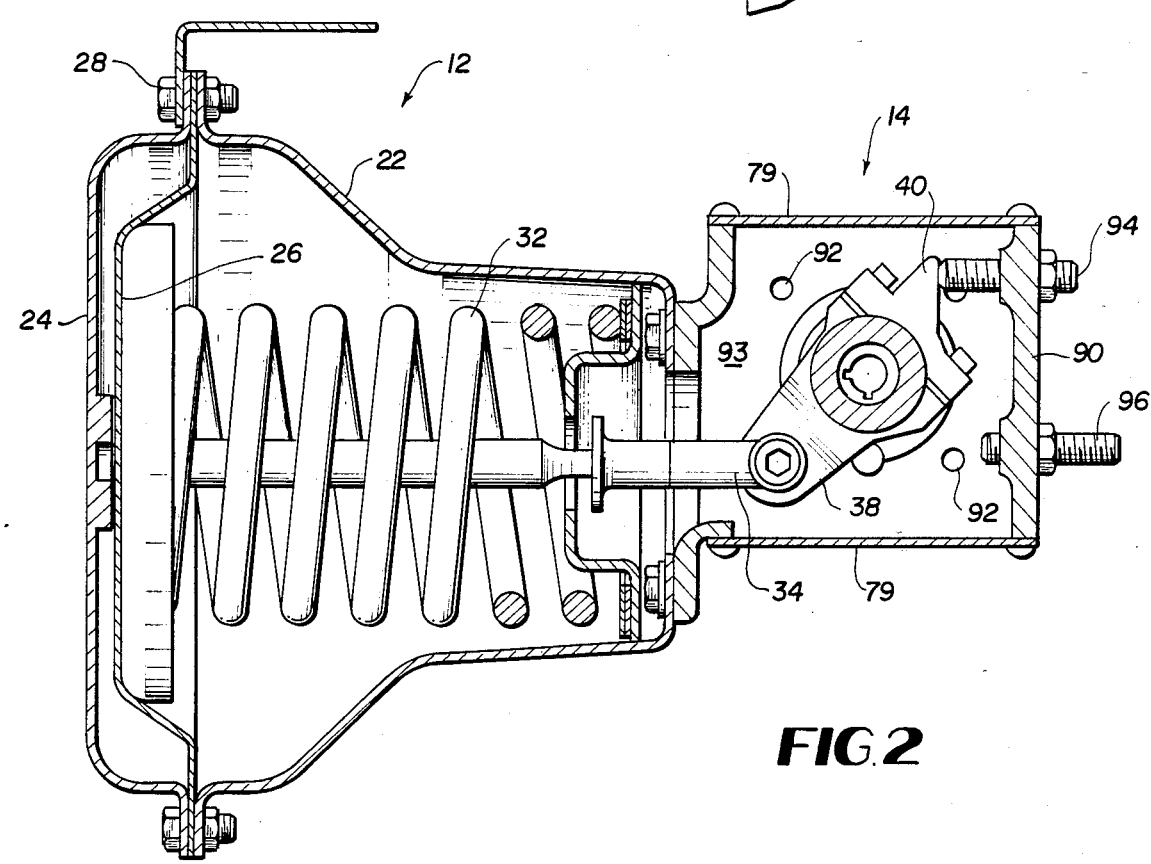
FIG. 2 is a cross-sectional view taken along lines 2—2 of FIG. 1.

The force producing section 12, specifically illustrated in FIG. 2, includes a spring case 22 and a diaphragm cover 24 having a diaphragm 26 secured therebetween by fasteners 28. A fluid inlet 30 is provided in the diaphragm cover 24. A spring assembly 32 is provided in the spring cover 22 to act against the fluid between the diaphragm 26 and the diaphragm cover 24. Clevis assembly 34 is connected to the diaphragm 26 and moves ordinarily right and left with the displacement of the diaphragm. Clevis assembly 34 is connected to the coupler assembly 14. The diaphragm is an example of the force producing section which could also includes piston arrangements.

Figure 5:
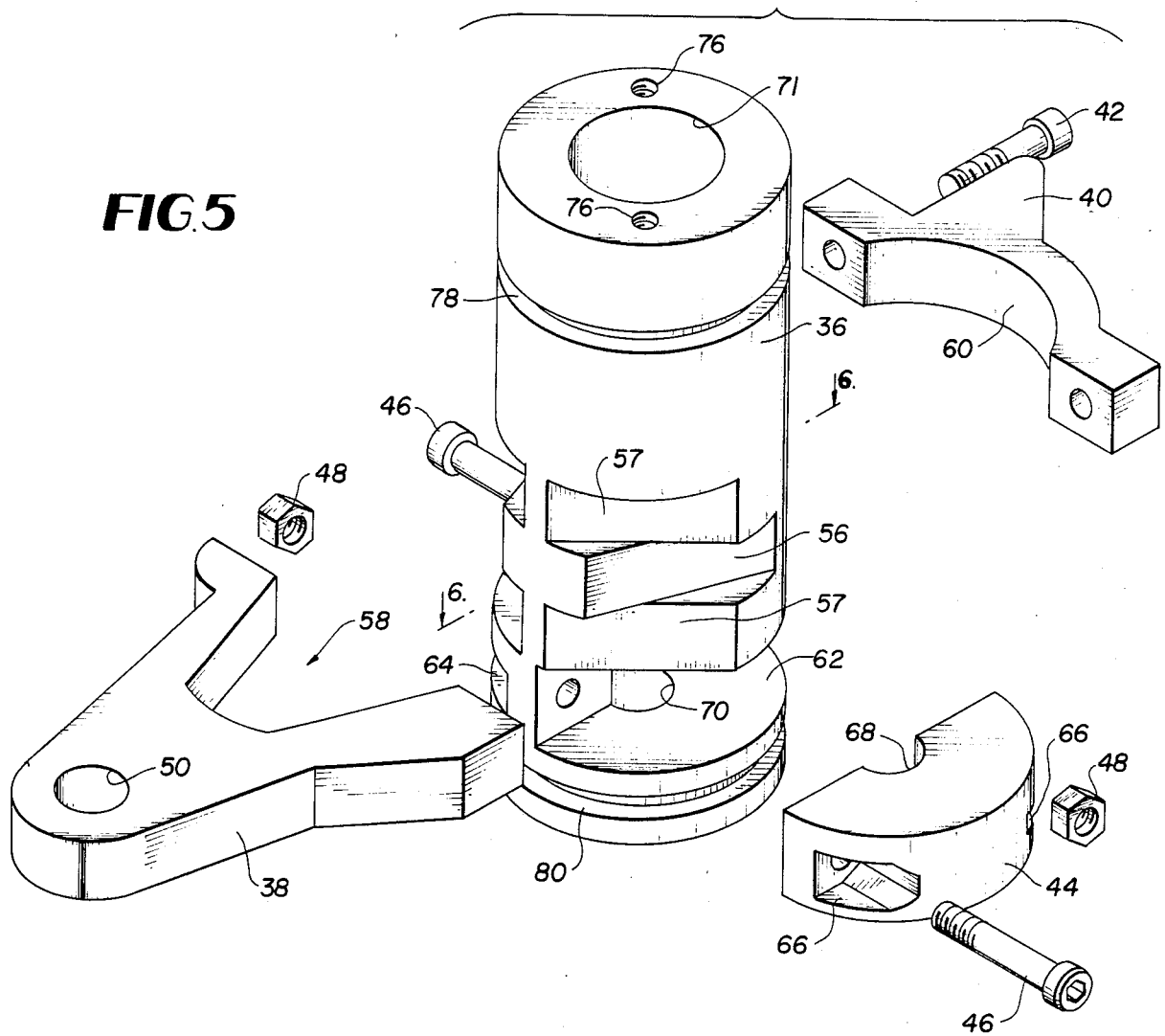
FIG. 5 is an exploded perspective view of the coupling shaft, link arm and coupling clamp of FIG. 1.
Figure 6:
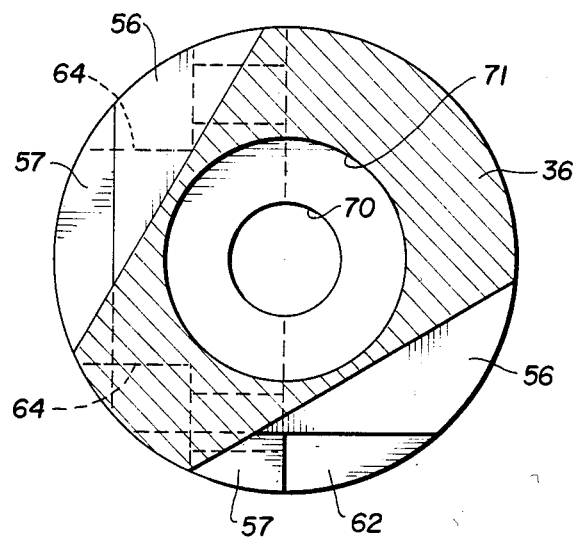
FIG. 6 is a cross-sectional view taken along line 6—6 of FIG. 5.

As illustrated in FIG. 5 the coupler assembly includes a coupling shaft 36, a link arm having a first element 38 and second element 40 joined by a pair of fasteners 42 and a coupling clamp 44 secured to the coupling shaft 36 by fasteners shown as bolts 46 and nuts 48 respectively. Element 38 of the link arm includes an orifice 50 which receives a shoulder bolt or pin 52 which extends through the clevis 34 and the link arm 38 and secured by a nut 54 (FIG. 1). Circumferial recesses 56 specifically illustrated in FIG. 6 provide a wedged shaped cross-section of the coupler shaft 36. The element 38 of the link arm includes a wedge shaped recess 58 which is received in the circumferial recesses 56 and engaged the wedge shaped cross-section. The second element 40 of the link arm has an arcuate segment 60 matching the outside circumference of the coupling shaft 36. The first element 38 of the link arm is inserted in the circumferial recess engaging the wedge shaped cross-section and the second element 40 is secured thereto by the fasteners 42.

Figure 4:
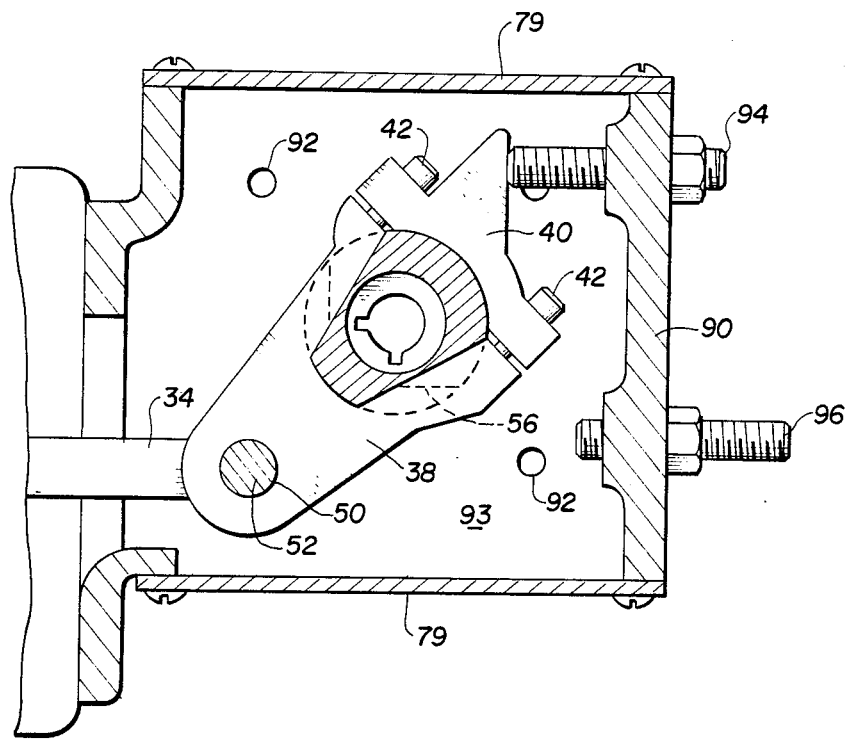
FIG. 4 is a cross-sectional view taken along line 4—4 of FIG. 1.

Both elements 38 and 40 have a thickness substantially equal to the height of the circumferial recess 56. By using a two element connection, the link arm has a adjustable opening which accommodates for any displacement or error in the formation of the wedge shaped opening 58 of the link arm 38 and the shape of the wedge shaped element produced by the circumferial recesses 56. This allows the coupling shaft 36 and the link arm elements to be cast elements without requiring specific machining of the wedge shaped opening 58 and the circumferial recesses 56. They may also be formed by forging, powder metal or cold forming operations. Also the fasteners 42 can further adjust for any wear produced between the elements. The mounting configuration of the link arm to the shaft 36 is specifically illustrated in FIG. 4.

Circumferial recess 57 are provided on each side of circumferial recess 56 in the coupling shaft 36. These provide clearance for the clevis assembly 34 when the actuator is rotated ninety degrees counter-clock-wise in FIG. 2.

Figure 3:
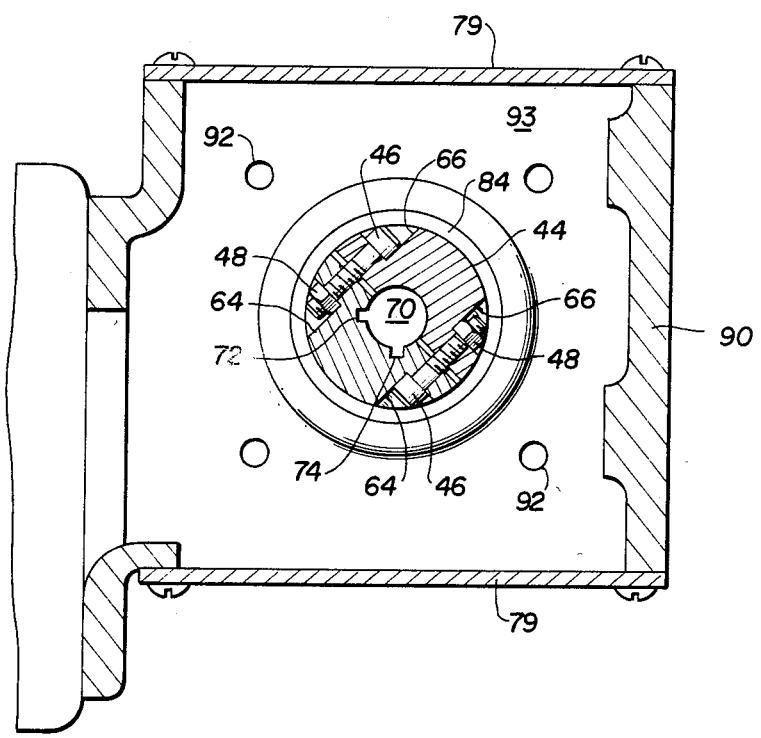
FIG. 3 is a cross-sectional view taken along line 3-3 of FIG. 1.

The coupling clamp 44 is received in a semi-circular circumferial recess 62 of coupling shaft 36. A three-sided recess 64 which is half of a hexagonal shape is provided in the coupling shaft 36 opposite the recess 62. Recesses 66 are also provided in the coupling clamp 44. The coupling hex shaped nuts 48 are retained by the half of hex recess 64 and 66 and the bolts are connected in the opposing recesses. The coupling clamp 44 includes an interior semi-circular recess 68 to mate with circular exterior of the valve shaft which extends through a circular axial recess 70 in coupling shaft 36. As illustrated specifically in FIG. 3, a portion of the axial recess 70 is machined to provide a pair of key ways 72 and 74. These key ways receive a single key on the side of the valve shaft. As is well known in the art by selecting key way 72 or 74, a quarter turn valve may be operated by the actuator in a normally open or a normally closed position or one of two ninety degree orientations of the actuator relative to the valve. As with the link arm, the coupling clamp 44 provides for adjustment of the securement of the valve shaft to the coupling shaft to accommodate for wear and tear as well as any tolerances produced by the castings and other manufacturing tolerance. The cast coupling shaft 36 with recess 62 form therein and the cast clamp 44 need not be expensive machine parts. A pointer 73 is illustrated in FIG. 1 secured to the top of the coupling shaft 36 by a pair of fasteners 75 received in threaded openings 76 (see FIG. 5). An axial recess 71 is provided in coupling shaft 36. The axial recess 71 reduces the amount of material which must be cast. Since recess 71 is coaxial with and has a greater diameter than axial recess 70, the amount of broaching needed to form key ways 72 and 74 or a polygon cross-section in axial recess 70 is also reduced. The axial recess 71 may also be broached to receive the male component of accessories for example limit switches and potentiometers and positioners used to control the force producing section. Coupling shaft 36 also includes a pair of annular recesses 78 and 80 which receive O-rings 82 if needed. It should be noted that the annular recesses 78 and 80, the threaded axial openings 76 and the key ways 72 and 74 are the only machined portions of the cast coupling shaft 36. The outer diameter of the coupling shaft may be machined to provide a better bearing surface.

The coupling shaft 36 is rotatably mounted to the housing 90 of the coupling assembly preferably by a pair of bearing surfaces illustrated as sleeve bearings 84. The bottom of the coupling shaft 36 rests on the top of adapter 16 in opposed walls 91 and 93. The housing 90 is a unitary structure having side covers 79 (FIG. 2) secured thereto. The aperatures in opposed walls 91 and 93 of the housing may be formed by a single boring operation. This minimizes machining cost and increases alignment. The unitary housing is also capable of withstanding substantial stress which is produced by the force producing section rotating the coupling shaft 36. The adapter 16 is mounted to the coupler housing 90 by fasteners 92. A pair of adjustable stops 94 and 96 extend into the interior of the coupler housing 90 and engage elements 40 and 38 respectively of the link arm to define the stop positions.

From the preceding description of the preferred embodiments, it is evident that the objects of the invention are attained in that providing a coupling shaft 36 in combination with a adjustable link arm for the force producing section and an adjustable coupler clamp for the valve shaft, the amount of machining is substantially reduced as well as providing adjustment for wear and tear to reduce lost motion. Although the present invention has been described and illustrated in detail, it is to be clearly understood that the same is by way of illustration, and example only and is to be taken by way of limitation. For example, the circular cross-section of the axial recess 70 and the key ways 72 and 74 may be replaced by a square or other polygram cross-section which matches the cross-section of the valve shaft 20. The spirit and scope of the present invention are to be limited only by the terms of the appended claims.

What is claimed is:

1. A valve actuator comprising:
an actuator housing;
a coupling shaft means rotatably mounted in said housing;
receiving means at one end of said coupling shaft means for receiving a valve shaft to be controlled by the actuator;
a circumferial recess in said coupling shaft means bound by opposed surfaces displaced from the ends of said coupling shaft means and defining a wedge shaped cross-section of said coupling shaft means in said circumferial recess;
an arm means in said circumferial recess and extending in a plane perpendicular to said coupling shaft means and including a first member having a wedge shaped radial recess and engaging a substantial portion of said wedge shaped cross-section of said coupling shaft means and a second member engaging the remaining portion of said wedge shaped cross-section of said coupling shaft means;
adjustment means adjustably interconnecting said first and second members for adjusting the size of said wedge shaped aperture and securing said arm means to said coupling shaft means; and
force producing means connected to said first member of said arm means for controlling the position of a valve by rotating said coupling shaft.

2. A valve actuator according to claim 1 wherein the height of said arm means and said circumferial recess are substantially the same.

3. A valve actuator according to claim 1 wherein adjustment means includes a pair of fasteners, one on each side of wedge shaped aperature.

4. A valve actuator according to claim 1 wherein said receiving means includes an axial recess having a key way for receiving said valve shaft having a key.

5. A valve actuator according to claim 4 wherein said receiving means includes a second circumferial recess, and a clamp member in said second radial recess forming a portion of a wall of said axial recess and means for securing said clamp member to said coupling shaft means.

6. A valve actuator according to claim 5 wherein said securing means includes pair of fasteners, one on each side of said axial recess.

7. A valve actuator according to claim 4 wherein said coupling shaft means includes a second axial recess coaxial with said receiving means axial recess, extending from the other end of said coupling shaft and having a greater diameter than said receiving means axial recess.

8. A valve actuator according to claim 1 wherein said coupling shaft means and said arm are cast with said circumferial recess and wedge shaped aperature cast formed therein.

9. A valve actuator according to claim 1 wherein said adjusting means adjusts the size of said wedge shape aperture without adjusting the alignment of said arm means to said coupling shaft means.

* * * * *

UNITED STATES PATENT AND TRADEMARK OFFICE
CERTIFICATE OF CORRECTION

PATENT NO. : 4,558,605

DATED : December 17, 1985

INVENTOR(S) : Douglas J. Tanner

It is certified that error appears in the above-identified patent and that said Letters Patent is hereby corrected as shown below:

Column 2, line 49, change "includes" to --include--.

Column 3, line 3, change "a" to --an--.

line 47, begin a new paragraph starting with "A pointer 73..."

Column 4, line 19, change "a" to --an--.

Claim 8, line 2, after "arm" insert --means--.

Signed and Sealed this

Eleventh Day of March 1986

[SEAL]

Attest:

DONALD J. QUIGG

Attesting Officer

Commissioner of Patents and Trademarks